US 8,104,964 B2

(12) United States Patent
Hori et al.

(10) Patent No.: US 8,104,964 B2
(45) Date of Patent: Jan. 31, 2012

(54) FLUID DYNAMIC BEARING UNIT

(75) Inventors: Masaharu Hori, Kuwana (JP); Masaaki Toda, Kuwana (JP); Isao Komori, Kuwana (JP)

(73) Assignee: NTN Corporation, Osaka-shi, Osaka (JP)

( * ) Notice: Subject to any disclaimer, the term of this patent is extended or adjusted under 35 U.S.C. 154(b) by 582 days.

(21) Appl. No.: 12/294,331

(22) PCT Filed: Mar. 19, 2007

(86) PCT No.: PCT/JP2007/055559
§ 371 (c)(1),
(2), (4) Date: Sep. 24, 2008

(87) PCT Pub. No.: WO2007/119428
PCT Pub. Date: Oct. 25, 2007

(65) Prior Publication Data
US 2009/0136165 A1    May 28, 2009

(30) Foreign Application Priority Data

Mar. 27, 2006   (JP) .................................. 2006-086359
Mar. 27, 2006   (JP) .................................. 2006-086371

(51) Int. Cl.
*F16C 32/06*    (2006.01)
(52) U.S. Cl. ........................................................ 384/107
(58) Field of Classification Search ................. 384/107, 384/111, 113, 100, 114, 118, 119; 360/99.08, 360/98.07; 417/354, 423.12, 423.13
See application file for complete search history.

(56) References Cited

U.S. PATENT DOCUMENTS

| | | | | |
|---|---|---|---|---|
| 4,254,961 A | * | 3/1981 | Fersht et al. | 277/410 |
| 4,965,476 A | * | 10/1990 | Lin | 310/51 |
| 5,683,183 A | * | 11/1997 | Tanaka et al. | 384/100 |
| 6,250,807 B1 | * | 6/2001 | Mori et al. | 384/100 |
| 6,794,774 B2 | * | 9/2004 | Obara et al. | 310/67 R |
| 6,948,852 B2 | * | 9/2005 | Oelsch | 384/100 |
| 7,654,742 B2 | * | 2/2010 | Nishimoto et al. | 384/107 |
| 2003/0169952 A1 | | 9/2003 | Yamashita et al. | |
| 2004/0174078 A1 | | 9/2004 | Kull | |
| 2007/0076990 A1 | * | 4/2007 | Tsai et al. | 384/100 |
| 2007/0206889 A1 | * | 9/2007 | Obara et al. | 384/100 |
| 2009/0190869 A1 | * | 7/2009 | Murata et al. | 384/107 |

FOREIGN PATENT DOCUMENTS

JP    10-318250 A    12/1998
(Continued)

OTHER PUBLICATIONS

Chinese Office Action dated Oct. 16, 2009, issued in corresponding Chinese Patent Application No. 200780011272.
International Search Report of PCT/JP2007/055559, date of mailing Jun. 26, 2007.

*Primary Examiner* — Richard W Ridley
*Assistant Examiner* — Terence Boes
(74) *Attorney, Agent, or Firm* — Westerman, Hattori, Daniels & Adrian, LLP

(57) ABSTRACT

A fluid dynamic bearing unit is provided which has a high load capacity against a moment load, whose bearing sleeves can be manufactured and fixed easily, and which can provide a required fixing power. The bearing sleeve is inserted into an inner periphery of a housing, and its bottom end is fixed to the top end of a spacer part with an adhesive. Another bearing sleeve is inserted into another part of the inner periphery of the housing, and its top end is fixed to the bottom end of the spacer part with an adhesive.

12 Claims, 12 Drawing Sheets

FOREIGN PATENT DOCUMENTS

| | | |
|---|---|---|
| JP | 11-155254 A | 6/1999 |
| JP | 2003-239951 A | 8/2003 |
| JP | 3602707 B2 | 12/2004 |
| JP | 2005-163903 A | 6/2005 |

* cited by examiner

FLUID DYNAMIC BEARING UNIT

BACKGROUND OF THE INVENTION

1. Field of the Invention

The present invention relates to a fluid dynamic bearing unit.

2. Description of the Related Art

Fluid dynamic bearing units support a shaft member without contact by a fluid's dynamic pressure effect occurring in their bearing clearances. Having such characteristics as high-speed rotation, high rotation accuracy, and low vibration, bearing units of this type are suitably used in motors that are mounted on various types of electric apparatuses including information devices. More specifically, they are used as spindle-motor bearing units in magnetic disk drives such as HDD, optical disc drives such as CD-ROM, CD-R/RW, and DVD-ROM/RAM, and magneto-optical disc drives such as MD and MO, and motor bearing units in polygon scanner motors of laser beam printers (LBP), color wheel motors of projectors, fan motors, and the like.

For example, a fluid dynamic bearing unit to be built in a spindle motor of a disk drive such as HDD has a radial bearing portion for supporting a shaft member in radial directions and a thrust bearing portion for supporting the shaft member in thrust directions, both of which may be configured as fluid dynamic bearings. Among the known examples of the radial bearing portion in this type of fluid dynamic bearing unit are ones in which dynamic pressure generating grooves are formed as a dynamic pressure generating portion in either one of the inner periphery of a bearing sleeve and the opposed outer periphery of a shaft member, with a radial bearing clearance between the two peripheries (for example, see Japanese Patent Application Laid-Open No. 2003-239951).

Now, information devices that incorporate fluid dynamic bearing units of the foregoing configuration, such as HDD or other disk drives, require even faster rotations for the sake of a further increase in read speed. This increases a moment load to act on the bearing portions that rotatably support the spindle shaft. To address this increased moment load, it is necessary to provide a plurality of radial bearing portions at axially separated positions, with an increased span between the radial bearing portions. In a conventional configuration, the plurality of radial bearing portions are formed on the inner side of a single bearing sleeve. Due to demands for motors of smaller sizes and for spindle shafts and bearing sleeves of accordingly smaller diameters, however, it is sometimes difficult to manufacture a bearing sleeve that is capable of an increased span between the radial bearing portions.

As means for increasing the span between the radial bearing portions and facilitating the manufacturing of the bearing sleeve as well, a plurality of bearing sleeves may be arranged in a plurality of positions axially separated from each other (for example, see the publication of Japanese Patent No. 3602707).

To arrange the bearing sleeves in a plurality of positions, each of the bearing sleeves is fixed to the inner periphery of the housing by adhesion, press fit, and the like. With adhesion, however, the fixing operation takes a lot of time and labor since the adhesion process must be carefully performed so that fluid channels for a lubricating fluid, formed in the outer peripheries of the bearing sleeves, may not be filled up with the adhesive. For press fit, sufficient fixing power is secured by increasing the interference between the outer peripheries of the bearing sleeves and the inner periphery of the housing. This narrows the inside diameter of the bearing sleeves with a decrease in the radial bearing clearances, possibly causing unfavorable effects on the radial bearing performance such as an increased torque loss. There is thus the need for improvements in terms of the fixing operation of the bearing sleeves and the provision of the fixing power.

Moreover, even when any of the foregoing fixing means including adhesion, press fit, and the like is employed, if the housing has a coefficient of linear expansion greater than that of the bearing sleeves, the bearing sleeves undergo a compressive force from the housing to shrink in the inside diameter due to a difference in thermal contraction between the members with decreasing temperature. This can produce unfavorable effects on the radial bearing performance for the same reason as mentioned above.

SUMMARY OF THE INVENTION

A first object of the present invention is to provide a fluid dynamic bearing unit which has a high load capacity against a moment load, whose bearing sleeve can be manufactured and fixed easily, and which can provide a required fixing power.

A second object of the present invention is to provide a fluid dynamic bearing unit which has a high load capacity against a moment load, whose bearing sleeve can be manufactured and fixed easily, and which can provide a required fixing power without causing a reduction in the inside diameter of the bearing sleeve. Yet another object is to provide a fluid dynamic bearing unit which can prevent or suppress a reduction in the inside diameter of the bearing sleeve, and the resulting decrease of the radial bearing clearance as well, due to a difference in thermal contraction between the two members with decreasing temperature even if the housing has a coefficient of linear expansion greater than that of the bearing sleeve.

To achieve the foregoing first object, a first aspect of the present invention provides a fluid dynamic bearing unit including: a housing; a bearing sleeve accommodated in the housing; a shaft member inserted into an inner periphery of the bearing sleeve; and a radial bearing portion for supporting the shaft member in a radial direction without contact by a dynamic pressure effect of a lubricating fluid occurring in a radial bearing clearance between the inner periphery of the bearing sleeve and an outer periphery of the shaft member. The fluid dynamic bearing unit is characterized in that the bearing sleeve comprises a plurality of bearing sleeves which are arranged so as to be axially separated from each other, that a spacer part is arranged between the axially-separated bearing sleeves, that the spacer part is stationarily arranged on the housing, and that the bearing sleeves are fixed to the spacer part by adhesion at their respective ends opposed to ends of the spacer part.

According to this first aspect, a plurality of bearing sleeves are arranged in a plurality of positions axially separated from each other. This can increase the span between the radial bearing portions to improve the load capacity against a moment load, and facilitate the manufacturing of the bearing sleeves. The bearing sleeves are fixed to the ends of the space part, which is stationarily arranged on the housing, by adhesion at their respective ends opposed to the ends of the spacer part. This eliminates the possibility that the adhesive may fill up fluid channels for the lubricating fluid that are formed in the outer peripheries of the bearing sleeves if any. A fixing power necessary for the bearing sleeves can also be provided.

To achieve the foregoing second object, second aspect of the present invention provides a fluid dynamic bearing unit including: a housing; a bearing sleeve accommodated in the housing; a shaft member inserted into an inner periphery of the bearing sleeve; and a radial bearing portion for supporting a shaft member in a radial direction without contact by a dynamic pressure effect of a lubricating fluid occurring in a radial bearing clearance between the inner periphery of the bearing sleeve and an outer periphery of the shaft member. The fluid dynamic bearing unit is characterized in that the bearing sleeve comprises a plurality of bearing sleeves which are arranged so as to be axially separated from each other, that a spacer part is formed between the axially-separated bearing sleeves, that the spacer part is stationarily arranged on the housing, and that the bearing sleeves are inserted into an inner periphery of the housing with a gap, and are fixed to the spacer part by adhesion at their respective ends opposed to ends of the spacer part.

According to this second aspect, a plurality of bearing sleeves are arranged in a plurality of positions axially separated from each other. This can increase the span between the radial bearing portions to improve the load capacity against a moment load, and facilitate the manufacturing of the bearing sleeves. The bearing sleeves are inserted into the inner periphery of the housing with a gap, and are fixed to the ends of the space part, which is stationarily arranged on the housing, by adhesion at their respective ends opposed to the ends of the spacer part. This eliminates the possibility that the adhesive may fill up fluid channels for the lubricating fluid that are formed in the outer peripheries of the bearing sleeves if any. A fixing power necessary for the bearing sleeves can also be provided without causing a reduction in the inside diameter of the bearing sleeves. In addition, even if the housing has a coefficient of linear expansion greater than that of the bearing sleeves, some or all of the difference in thermal contraction between the members with decreasing temperature is absorbed by the gaps between the outer peripheries of the bearing sleeves and the inner periphery of the housing. This prevents or suppresses a reduction in the inside diameter of the bearing sleeves ascribable to the difference in thermal contraction between the members, and the resulting decrease of the radial bearing clearances.

To arrange the spacer part stationarily on the housing, the foregoing first and second aspects shall each cover the configurations that the spacer part is integrally formed on the housing, and that a separate spacer part is fixed to the housing by appropriate means such as adhesion, press fit, press-fit adhesion (the combined use of press fit and adhesion), and welding.

In the foregoing first and second aspects, recess-like adhesion pockets are preferably formed in at least either the ends of the bearing sleeves or the ends of the spacer part. The adhesive pockets can capture some of the adhesive that is filled or applied to between the ends of the bearing sleeves and the ends of the spacer part, thereby avoiding the phenomenon that an excess of the adhesive flows radially inward to reach the inner peripheries of the bearing sleeves (the radial bearing clearances).

In the first and second aspects, the spacer part may have a fluid channel opened to both axial sides. The fluid channel in the spacer part may also be put into communication with axial fluid channels formed between the inner periphery of the housing and the outer peripheries of the bearing sleeves. These fluid channels constitute a circulation channel for letting the lubricating fluid flow and circulate inside the housing. The lubricating fluid flows and circulates through this circulation channel, whereby the lubricating fluid filled in the internal space of the housing, including the bearing clearances, is maintained in favorable pressure balance. This also prevents the production of bubbles due to the occurrence of a local negative pressure, as well as the leakage of the lubricating fluid, the production of vibrations, and other problems ascribable to the production of bubbles. Since the circulation channel comes to open-air sides in part, air bubbles, if any, that get into the lubricating fluid for any reason can be emitted to the open-air sides while circulating with the lubricating fluid. This prevents the adverse effects of bubbles more effectively.

In the foregoing first and second aspects, the shaft member may have a protrusion part protruding axially outward, and a thrust bearing portion for supporting the shaft member in a thrust direction without contact by a dynamic pressure effect of the lubricating fluid occurring in a thrust bearing clearance may be formed between an end of the protrusion part and an end of one of the bearing sleeves. The protrusion part may be integrally formed on the shaft member, or may be fixed to the shaft member. Dynamic pressure generating means (such as dynamic pressure generating grooves) of the thrust bearing portion may be formed in either the end of the protrusion or the end of the bearing sleeve.

In this case, a seal space may be formed radially outside the foregoing protrusion part of the shaft member. This seal space has the function of absorbing a volume change (expansion and contraction) of the lubricating fluid filled in the internal space of the housing due to temperature variations, i.e., a so-called buffer function.

In the foregoing first and second aspects, the housing may be an article die-molded from a molten material. The housing may be made of either a resin material or a metal material. If the housing is made of a resin material, for example, a thermoplastic resin or the like may be injection molded. If the housing is made of a metal material, for example, an aluminum alloy, a magnesium alloy, stainless steel, or the like may be die cast or injection molded (by so-called MIM or thixo-molding).

The fluid dynamic bearing unit according to the foregoing first aspect is suitably used in a motor that is built in a disk drive such as HDD, or a server HDD in particular.

The fluid dynamic bearing unit according to the foregoing second aspect is suitably used in a motor that is built in a disk drive such as HDD.

According to the first aspect, it is possible to provide a fluid dynamic bearing unit which has a high load capacity against a moment load, whose bearing sleeves can be manufactured and fixed easily, and which can provide a required fixing power.

According to the second aspect, it is possible to provide a fluid dynamic bearing unit which has a high load capacity against a moment load, whose bearing sleeves can be manufactured and fixed easily, and which can provide a required fixing power without causing a reduction in the inside diameter of the bearing sleeves. In addition, it is possible to prevent or suppress a reduction in the inside diameter of the bearing sleeves, and the resulting decrease of the radial bearing clearances as well, due to a difference in thermal contraction between the members with decreasing temperature even if the housing has a coefficient of linear expansion higher than that of the bearing sleeves.

DETAILED DESCRIPTION OF THE PREFERRED EMBODIMENTS

Hereinafter, embodiments of the present invention will be described with reference to the drawings.

Figure 1:
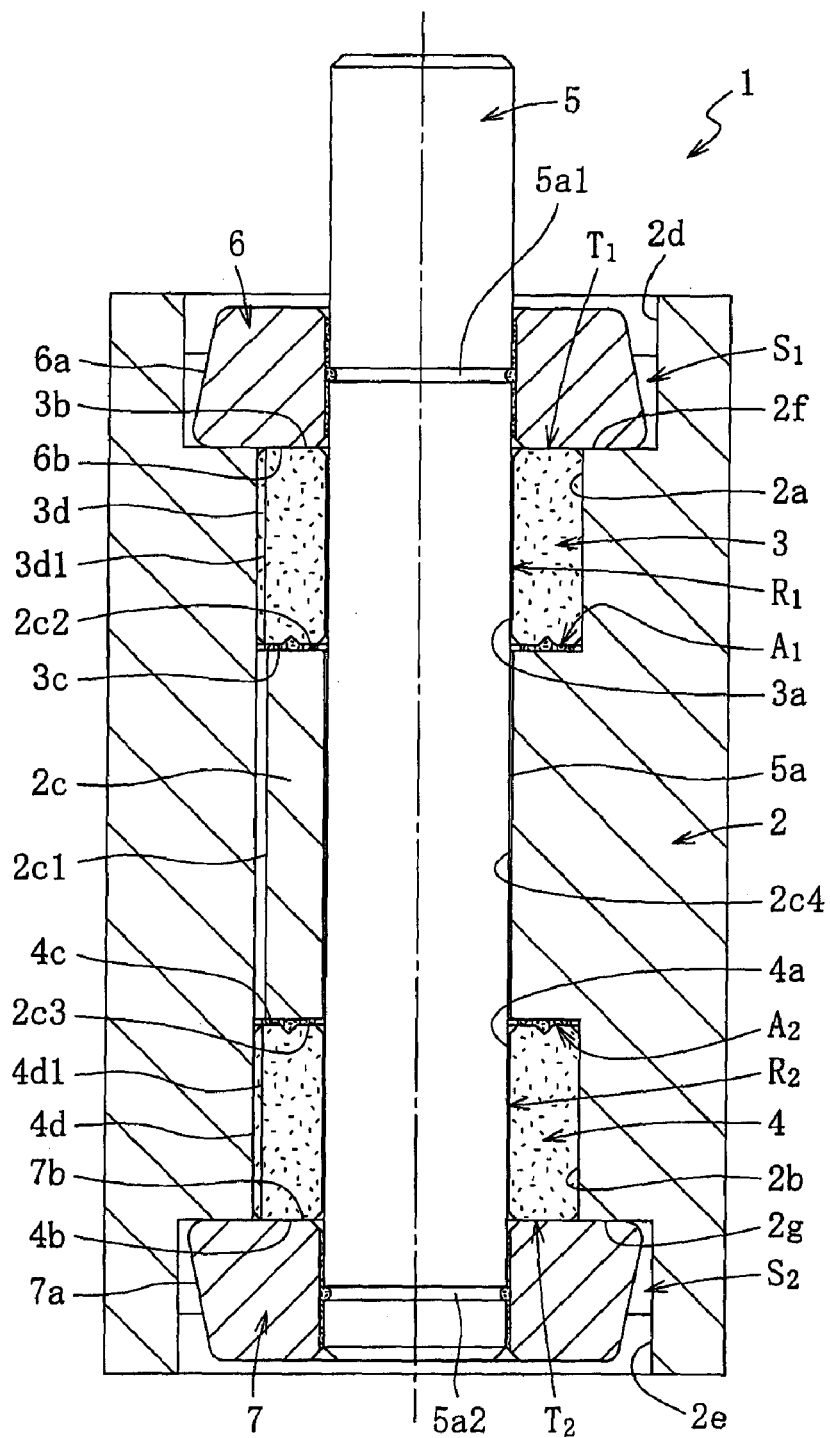
FIG. 1 is a sectional view of a fluid dynamic bearing unit according to a first embodiment.

FIG. 1 shows a fluid dynamic bearing unit 1 according to a first embodiment. This fluid dynamic bearing unit 1 supports rotation of a spindle shaft of a motor to be built in a HDD, for example, or a server HDD in particular. This fluid dynamic bearing unit 1 includes, as its primary components: a housing 2; a plurality of, for example, two bearing sleeves 3 and 4 which are accommodated in the housing 2 at positions axially separated from each other; and a shaft member 5 which is inserted into the inner peripheries of the bearing sleeves 3 and 4.

As will be described later, a first radial bearing portion $R_1$ is formed between the inner periphery 3a of the bearing sleeve 3 and the outer periphery 5a of the shaft member 5. A second radial bearing portion $R_2$ is formed between the inner periphery 4a of the bearing sleeve 4 and the outer periphery 5a of the shaft part 5. Moreover, in this embodiment, a first thrust bearing portion $T_1$ is formed between the top end 3b of the bearing sleeve 3 and the bottom end 6b of a seal member 6. A second thrust bearing portion $T_2$ is formed between the bottom end 4b of the bearing sleeve 4 and the top end 7b of a seal member 7. For convenience of explanation, the following description will be given with the side where an end of the shaft member 5 protrudes from the housing 2 (the top side of the diagram) as top side, and with the axially opposite side as bottom side.

The housing 2 is integrally formed, for example, by injection molding a resin material. It has the inner peripheries 2a and 2b in which the bearing sleeves 3 and 4 are accommodated, and a spacer part 2c which protrudes radially inward from the inner peripheries 2a and 2b. The inner peripheries 2a and 2b lie in positions axially separated from each other, corresponding to the positions where the bearing sleeves 3 and 4 are arranged. The area between the inner peripheries 2a and 2b is the spacer part 2c. Note that the inner peripheries 2a and 2b have the same diameter. In this embodiment, the spacer part 2c has axial fluid channels 2c1. The fluid channels 2c1 are opened to both the top end 2c2 and the bottom end 2c3 of the spacer part 2c. There are formed a plurality of, for example, three fluid channels 2c1 at regular circumferential intervals. Large diameter portions 2d and 2e are also formed at both ends of the housing 2. The large diameter portions 2d and 2e communicate with the inner peripheries 2a and 2b through step surfaces 2f and 2g, respectively.

The fluid channels 2c1 of the spacer part 2c may be formed by applying hole machining after the housing 2 is molded. For the sake of reduced machining man-hours and the resulting reduction in the manufacturing cost, however, they are preferably molded simultaneously with the molding of the housing 2. This can be achieved by providing molding pins corresponding to the shapes of the fluid channels 2c1 on the molding die for the housing 2 to be molded in. The fluid channels 2c1 are not limited to circular cross sections and may have noncircular shapes (such as elliptic and polygonal). Furthermore, the fluid channels 2c1 need not have a constant cross-sectional area across the axial direction. For example, some portions may have relatively greater cross-sectional areas, and others relatively smaller cross-sectional areas.

The housing 2 is made primarily of thermoplastic resin. Examples of available resins include amorphous resins such as polysulfone (PSU), polyethersulfone (PES), polyphenylsulfone (PPSU), and polyetherimide (PEI), and crystalline resins such as liquid crystal polymer (LCP), polyetheretherketone (PEEK), polybutylene terephthalate (PBT), and polyphenylene sulfide (PPS). The types of fillers for filling the foregoing resin are not limited in particular, either. Examples of available fillers include fibrous fillers such as glass fiber, whisker-like fillers such as potassium titanate, scale-like fillers such as mica, and fibrous or powder conductive fillers such as carbon fiber, carbon black, graphite, carbon nanomaterials, and metal powders. These fillers each may be used alone, or two or more types may be mixed in use. In this embodiment, the housing 2 is made of a resin material that is composed of liquid crystal polymer (LCP) as a crystalline resin and 2% to 8% by weight of carbon fibers or carbon nanotubes as a conductive filler.

The shaft member 5 is made of metal a material such as stainless steel, is shaped into a shaft of generally uniform diameter on the whole. In this embodiment, the seal members 6 and 7 of annular shape are also fixed to the shaft member 5 by appropriate fixing means such as adhesion and press-fit adhesion (the combined use of press fit and adhesion). These seal members 6 and 7 are shaped to protrude radially outward from the outer periphery 5a of the shaft member 5, and are accommodated in the large diameter portions 2d and 2e of the housing 2, respectively. To improve the fixing strength of the adhesive, circumferential grooves 5a1 and 5a2, or adhesive pockets, are formed in the outer periphery 5a of the shaft member 5 at positions where the seal members 6 and 7 are fixed to. The seal members 6 and 7 may be made of brass or other soft metal materials, or other metal materials, or may be made of resin materials. Either one of the seal members 6 and 7 may be formed integrally with the shaft member 5. In this case, the assembly consisting of the shaft member 5 and the one seal member may be formed as a composite body of metal and resin. In one possible example, the shaft member 5 is made of metal, and the one seal member is insert molded using resin.

The outer periphery 6a of the seal member 6 and the large diameter portion 2d of the housing 2 create a seal space $S_1$ of predetermined capacity therebetween. The outer periphery 7a of the seal member 7 and the large diameter portion 2e of the housing 2 create a seal space $S_2$ of predetermined capacity therebetween. In this embodiment, the outer periphery 6a of the seal member 6 and the outer periphery 7a of the seal member 7 are shaped into tapered surfaces which gradually decrease in diameter toward the respective outer sides of the housing 2. Consequently, both the seal spaces $S_1$ and $S_2$ have a tapered shape such that they gradually decrease toward the inside of the housing 2.

The bearing sleeves 3 and 4 are formed in a cylindrical shape out of a porous body of sintered metal, for example, or a porous body of sintered metal mainly composed of copper in particular. The bearing sleeves 3 and 4 are inserted into the inner peripheries 2a and 2b of the housing 2, respectively, or press fitted therein with a pressing force not as high as deforms the inner peripheries 3a and 4a (light press fit).

Figure 4:
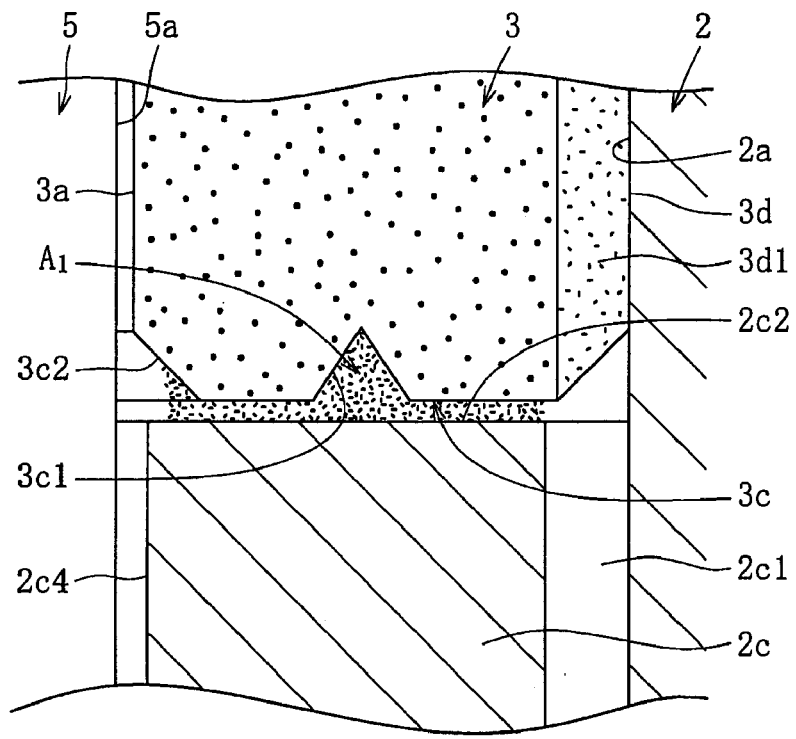
FIG. 4 is an enlarged sectional view showing the vicinities of locations where the bearing sleeves and a spacer part are fixed to each other by adhesion.
Figure 4:
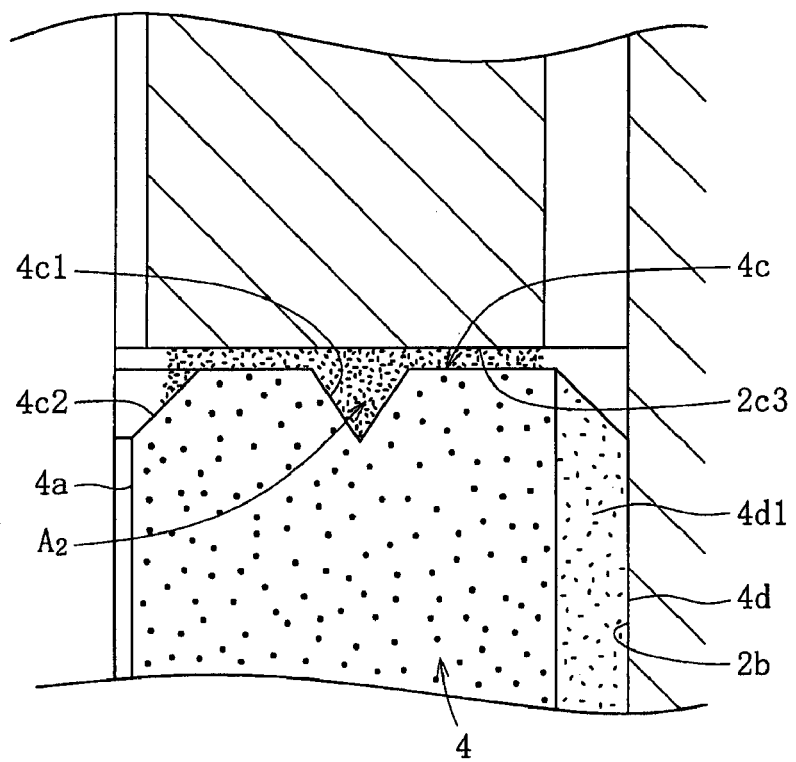

As shown enlarged in FIG. 4, the bottom end 3c of the bearing sleeve 3 is then fixed to the top end 2c2 of the spacer part 2c with an adhesive $A_1$. The bottom end 3c of the bearing sleeve 3 has an adhesive pocket 3c1 of circumferential groove shape. Some of the adhesive $A_1$ gets into the adhesive pocket 3c1, which precludes the phenomenon that an excess of the adhesive $A_1$ flows radially inward to reach the inner periphery 3a of the bearing sleeve 3 (the radial bearing clearance). The bottom end 3c may have a plurality of circumferential grooves or adhesive pockets 3c1. Note that the bottom end 3c has a chamfer 3c2 on its inner side, and this chamfer 3c2 also contributes to preventing the adhesive $A_1$ from reaching the radial inner side. The bottom end 3c of the bearing sleeve 3 preferably has a surface pore ratio lower than that of the outer periphery 3d, so that it becomes difficult for the adhesive $A_1$ to reach the inside of the bearing sleeve 3 through the surface pores of the bottom end 3c. The recessed adhesive pocket may be formed in the top end 2c2 of the spacer part 2c, or both in the bottom end 3c of the bearing sleeve 3 and the top end 2c2 of the spacer part 2c.

Similarly, the top end 4c of the bearing sleeve 4 is fixed to the bottom end 2c3 of the spacer part 2c with an adhesive $A_2$. The top end 4c of the bearing sleeve 4 has an adhesive pocket 4c1 of circumferential groove shape. Some of the adhesive $A_2$ gets into the adhesive pocket 4c1, which prevents the phenomenon that an excess of the adhesive $A_2$ flows radially inward to reach the inner periphery 4a of the bearing sleeve 4 (the radial bearing clearance) The top end 4c may have a plurality of circumferential grooves or adhesive pockets 4c1. Note that the bottom end 4c has a chamfer 4c2 on its inner side, and this chamfer 4c2 also contributes to preventing the adhesive $A_2$ from reaching the radial inner side. The top end 4c of the bearing sleeve 4 preferably has a surface pore ratio lower than that of the outer periphery 4d, so that it becomes difficult for the adhesive $A_2$ to reach the inside of the bearing sleeve 4 through the surface pores of the top end 4c. The recessed adhesive pocket may be formed in the bottom end 2c3 of the spacer part 2c, or both in the top end 4c of the bearing sleeve 4 and the bottom end 2c3 of the spacer part 2c.

Figure 2:
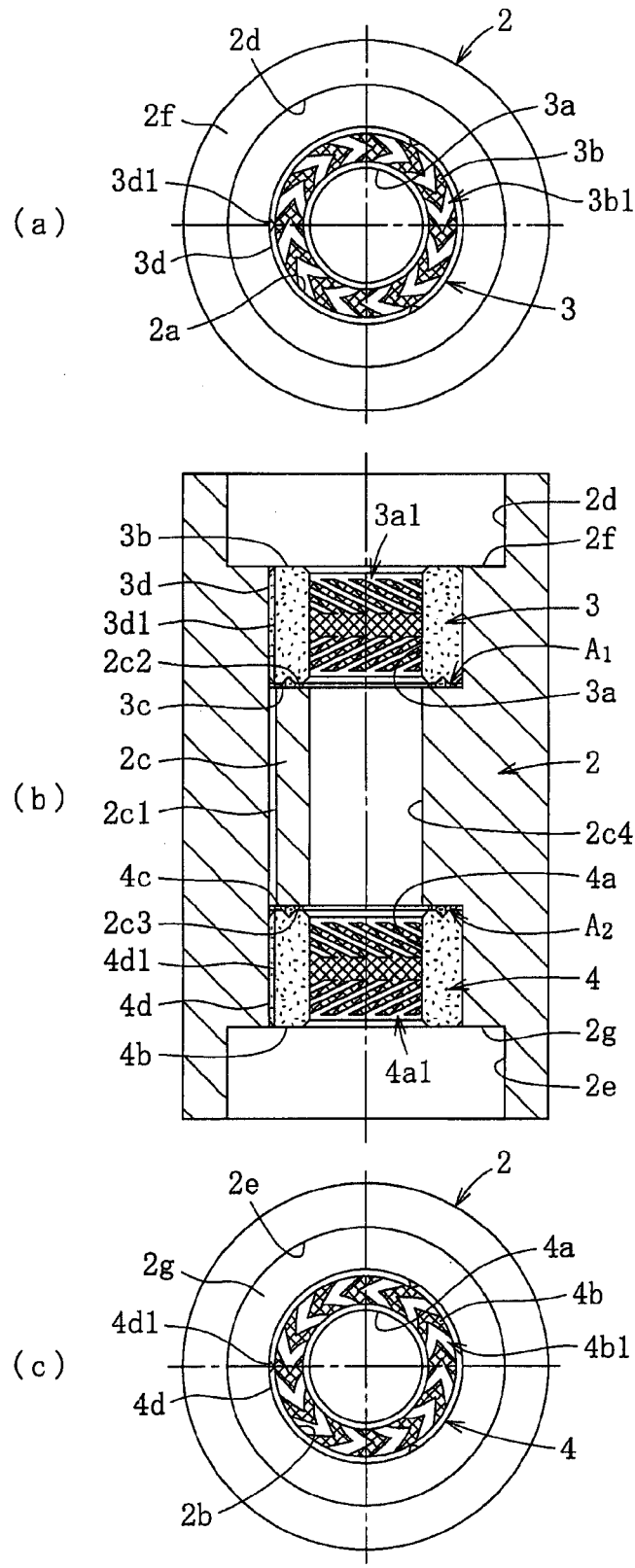
FIGS. 2A, 2B, and 2C are a top view, sectional view, and bottom view, respectively, showing a state where bearing sleeves are fixed to a housing.

As shown in FIGS. 2A to 2C, the bearing sleeve 3 has dynamic pressure generating grooves 3a1 of herringbone shape in the inner periphery 3a where to make the radial bearing surface of the first radial bearing portion $R_1$, dynamic pressure generating grooves 3b1 of herringbone shape in the top end 3b where to make the thrust bearing surface of the first thrust bearing portion $T_1$, and axial grooves 3d1 in the outer periphery 3d. There are formed a plurality of, for example, three axial grooves 3d1 at regular circumferential intervals. These axial grooves 3d1 and the inner periphery 2a of the housing 2 create axial fluid channels therebetween. Similarly, the bearing sleeve 4 has dynamic pressure generating grooves 4a1 of herringbone shape in the inner periphery 4a where to make the radial bearing surface of the second radial bearing portion $R_2$, dynamic pressure generating grooves 4b1 of herringbone shape in the bottom end 4b where to make the thrust bearing surface of the second thrust bearing portion $T_2$, and axial grooves 4d1 in the outer periphery 4d. There are formed a plurality of, for example, three axial grooves 4d1 at regular circumferential intervals. These axial grooves 4d1 and the inner periphery 2b of the housing 2 create axial fluid channels therebetween.

Figure 3:
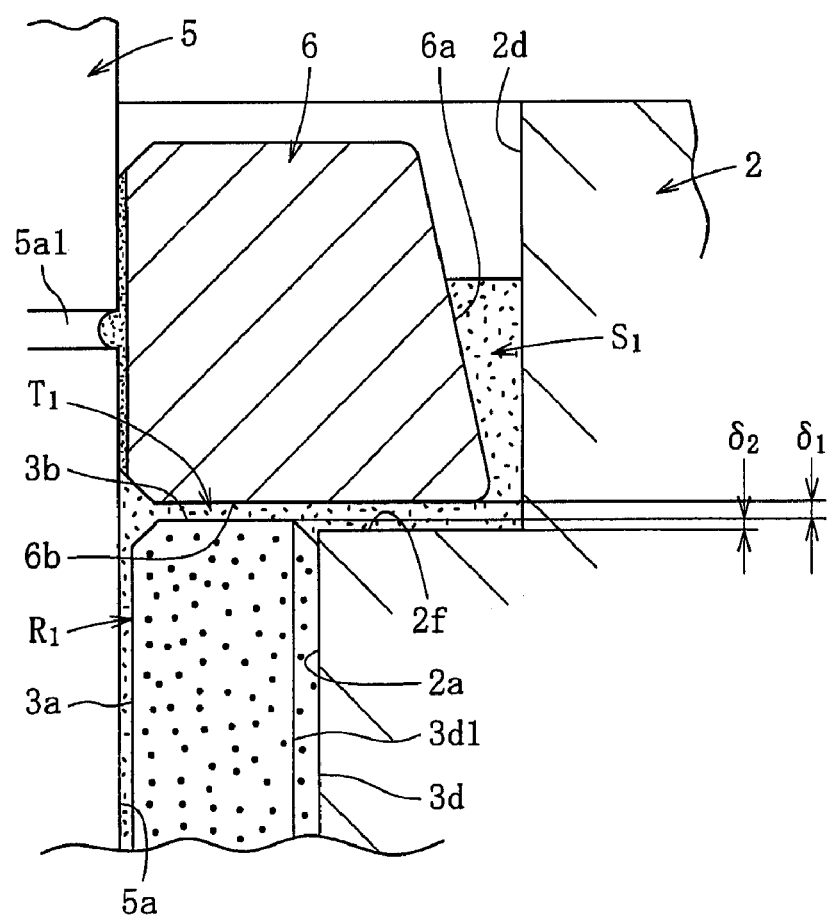
FIG. 3 is an enlarged sectional view showing an upper area of the housing.

As shown enlarged in FIG. 3, the bearing sleeve 3 is fixed to the top end 2c2 of the spacer part 2c with the adhesive $A_1$ so that the top end 3b is flush with the upper step surface 2f of the housing 2 or protrudes from the step surface 2f by a small dimension $\delta_2$. This state can be achieved by controlling the axial dimension of the bearing sleeve 3 and the axial dimension of the inner periphery 2a of the housing 2 (or the axial dimension of the spacer part 2c). As shown in the diagram, when the top end 3b of the bearing sleeve 3 protrudes from the step surface 2f by the dimension $\delta_2$, the axial dimension between the bottom end 6b of the seal member 6 and the step surface 2f exceeds the thrust bearing clearance $\delta_1$ of the first thrust bearing portion $T_1$. Although not shown in the drawings, the same holds for the bearing sleeve 4.

This fluid dynamic bearing unit 1 is assembled, for example, in the following steps.

Initially, the adhesive $A_1$ is applied to the bottom end 3c of the bearing sleeve 3 or the top end 2c2 of the spacer part 2c. The bearing sleeve 3 is then inserted into the inner periphery 2a of the housing 2 so that the bottom end 3c of the bearing sleeve 3 comes into contact with the top end 2c2 of the spacer part 2c with the adhesive $A_1$ therebetween. Here, the axial grooves 3d1 of the bearing sleeve 3 and the fluid channels 2c1 of the spacer part 2c are positioned to each other. This establishes communication between the fluid channels formed by the axial grooves 3d1 and the fluid channels 2c1 of the spacer part 2c.

Next, the adhesive $A_2$ is applied to the top end 4c of the bearing sleeve 4 or the bottom end 2c3 of the spacer part 2c. The bearing sleeve 4 is then inserted into the inner periphery 2b of the housing 2 so that the top end 4c of the bearing sleeve 4 comes into contact with the bottom end 2c3 of the spacer part 2c with the adhesive $A_2$ therebetween. Here, the axial grooves 4d1 of the bearing sleeve 4 and the fluid channels 2c1 of the spacer part 2c are positioned to each other. This establishes communication between the fluid channels formed by the axial grooves 4d1 and the fluid channels 2c1 of the spacer part 2c.

The adhesives $A_1$ and $A_2$ are then cured to form the assembly of the housing 2 and the bearing sleeves 3 and 4 as shown in FIGS. 2A to 2C.

Subsequently, the shaft member 5 is inserted into the inner peripheries 3a and 4a of the bearing sleeves 3 and 4 and the inner periphery 2c4 of the spacer part 2c. The seal members 6 and 7 are fixed to the predetermined positions of the shaft member 5. Note that one of the seal members 6 and 7 may be previously fixed to the shaft member 5 before the insertion, or may be formed integrally with the shaft member 5.

After the assembly is completed through the foregoing steps, a lubricating fluid, for example, lubricating oil is filled into the internal space of the housing 2 that is sealed with the seal members 6 and 7, including the internal pores of the bearing sleeves 3 and 4 (the internal pores in the porous body texture). The lubricating oil can be filled, for example, by immersing the assembled fluid bearing unit 1 into the lubricating oil in a vacuum bath, and then releasing it to the atmospheric pressure.

When the shaft member 5 is rotated, the inner periphery 3a of the bearing sleeve 3 and the inner periphery 4a of the bearing sleeve 4 are opposed to the outer periphery 5a of the shaft member 5 across respective radial bearing clearances. The gap between the inner periphery 2c4 of the spacer part 2c and the outer periphery 5a of the shaft member 5 is greater than the foregoing radial bearing clearances. The top end 3*b* of the bearing sleeve 3 is opposed to the bottom end 6*b* of the seal member 6 across a thrust bearing clearance. The bottom end 4*b* of the bearing sleeve 4 is opposed to the top end 7*b* of the seal member 7 across a thrust bearing clearance. With the rotation of the shaft member 5, a dynamic pressure of the lubricating oil occurs in the foregoing radial bearing clearances. The shaft member is then rotatably supported in the radial directions without contact by the films of the lubricating oil formed in the radial bearing clearances. This constitutes the first radial bearing portion $R_1$ and the second radial bearing portion $R_2$ which rotatably support the shaft member 5 in the radial directions without contact. In the meantime, a dynamic pressure of the lubricating oil also occurs in the foregoing thrust bearing clearances. The seal members 6 and 7 fixed to the shaft member 5 are then rotatably supported in the thrust directions without contact by the films of the lubricating oil formed in the thrust bearing clearances. This forms the first thrust bearing portion $T_1$ and the second thrust bearing portion $T_2$ which rotatably support the shaft member 5 in the thrust directions without contact.

As described above, the seal spaces $S_1$ and $S_2$ formed on the side of the outer periphery 6*a* of the seal member 6 and on the side of the outer periphery 7*a* of the seal member 7 have the tapered shapes, gradually decreasing toward the inside of the housing 2. The lubricating oil in both the seal spaces $S_1$ and $S_2$ is thus drawn into directions where the seal spaces get narrower, by the drawing action from the capillary force and by the drawing action from the centrifugal force during rotation. This consequently prevents leakage of the lubricating oil from inside the housing 2 effectively. The seal spaces $S_1$ and $S_2$ also have the buffer function of absorbing a volume change of the lubricating oil filled in the internal space of the housing 2 ascribable to temperature variations. Within the intended range of temperature variations, the surfaces of the lubricating oil remain in the seal spaces $S_1$ and $S_2$ all the time.

In addition, a series of circulation channels is formed inside the housing 2, including: the fluid channels formed by the axial grooves 3*d*1 of the bearing sleeve 3; the fluid channels formed by the axial grooves 4*d*1 of the bearing sleeve 4; the fluid channels 2*c*1 of the spacer part 2*c*; all the bearing clearances (the radial bearing clearances of the first radial bearing portion $R_1$ and the second radial bearing portion $R_2$, and the thrust bearing clearances of the first thrust bearing portion $T_1$ and the second thrust bearing portion $T_2$); and the gap between the inner periphery 2*c*4 of the spacer part 2*c* and the outer periphery 5*a* of the shaft member 5. The lubricating oil filled in the internal space of the housing 2 then flows and circulates through these circulation channels, whereby the lubricating oil is maintained in favorable pressure balance. This also prevents the production of bubbles due to the occurrence of a local negative pressure, as well as the leakage of the lubricating oil, the production of vibrations, etc., ascribable to the production of bubbles. In addition, the fluid channels formed by the axial grooves 3*d*1 of the bearing sleeve 3 and the fluid channels formed by the axial grooves 4*d*1 of the bearing sleeve 4 communicate at either end with the respective open-air sides, i.e., the seal spaces $S_1$ and $S_2$. Consequently, air bubbles, if any, that get into the lubricating oil for any reason can be emitted to the open-air sides while circulating with the lubricating oil. This prevents the adverse effects of bubbles more effectively.

Figure 5:
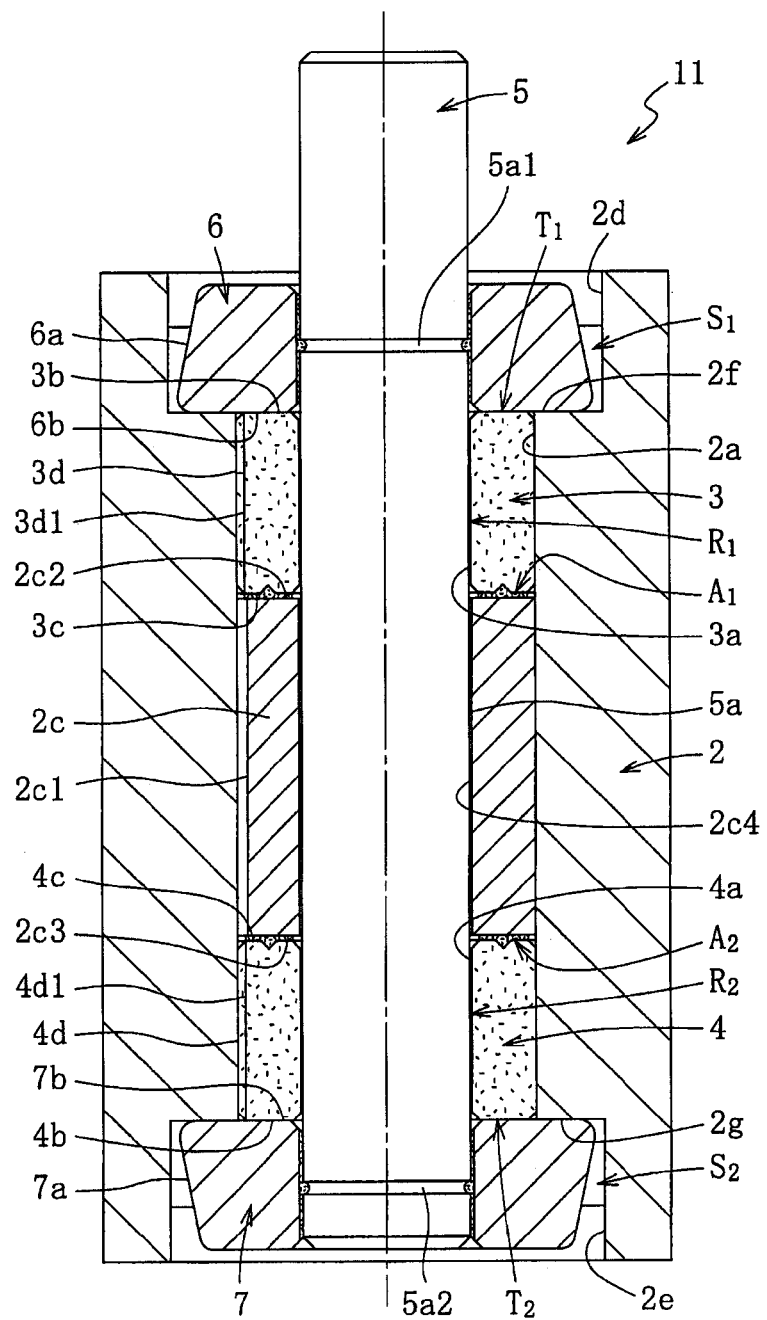
FIG. 5 is a sectional view of a fluid dynamic bearing unit according to a second embodiment.

FIG. 5 shows a fluid dynamic bearing unit 11 according to a second embodiment. This fluid dynamic bearing unit 11 differs from the fluid dynamic bearing unit 1 according to the foregoing first embodiment in that the spacer part 2*c* is made of a sleeve-like member separate from the housing 2, and this spacer part 2*c* is fixed to the inner periphery 2*a* of the housing 2 by appropriate means such as adhesion, press fit, and press-fit adhesion. The fluid channels 2*c*1 are formed in the outer periphery of the spacer part 2*c* in the form of axial grooves. This spacer part 2*c* may be made of a resin material the same as or different from that of the housing 2, or a metal material. The inner periphery 2*a* of the housing 2 has an axially straight shape between the locations where the bearing sleeve 3 is mounted on and where the bearing sleeve 4 is mounted on. As compared to the fluid dynamic bearing unit 1 of the first embodiment, the housing 2 is simplified in shape. In other respects, the same discussion applies as in the first embodiment. Substantially the same members or parts will thus be designated by like reference numerals, and redundant description will be omitted.

Figure 6:
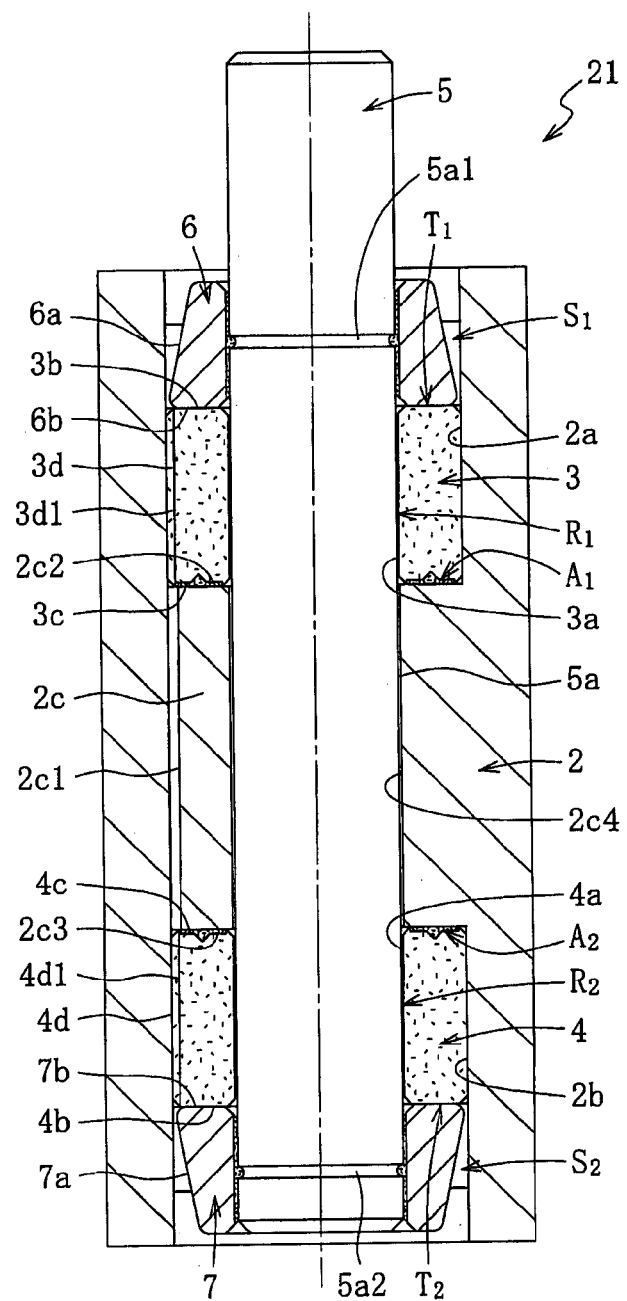
FIG. 6 is a sectional view of a fluid dynamic bearing unit according to a third embodiment.
Figure 7:
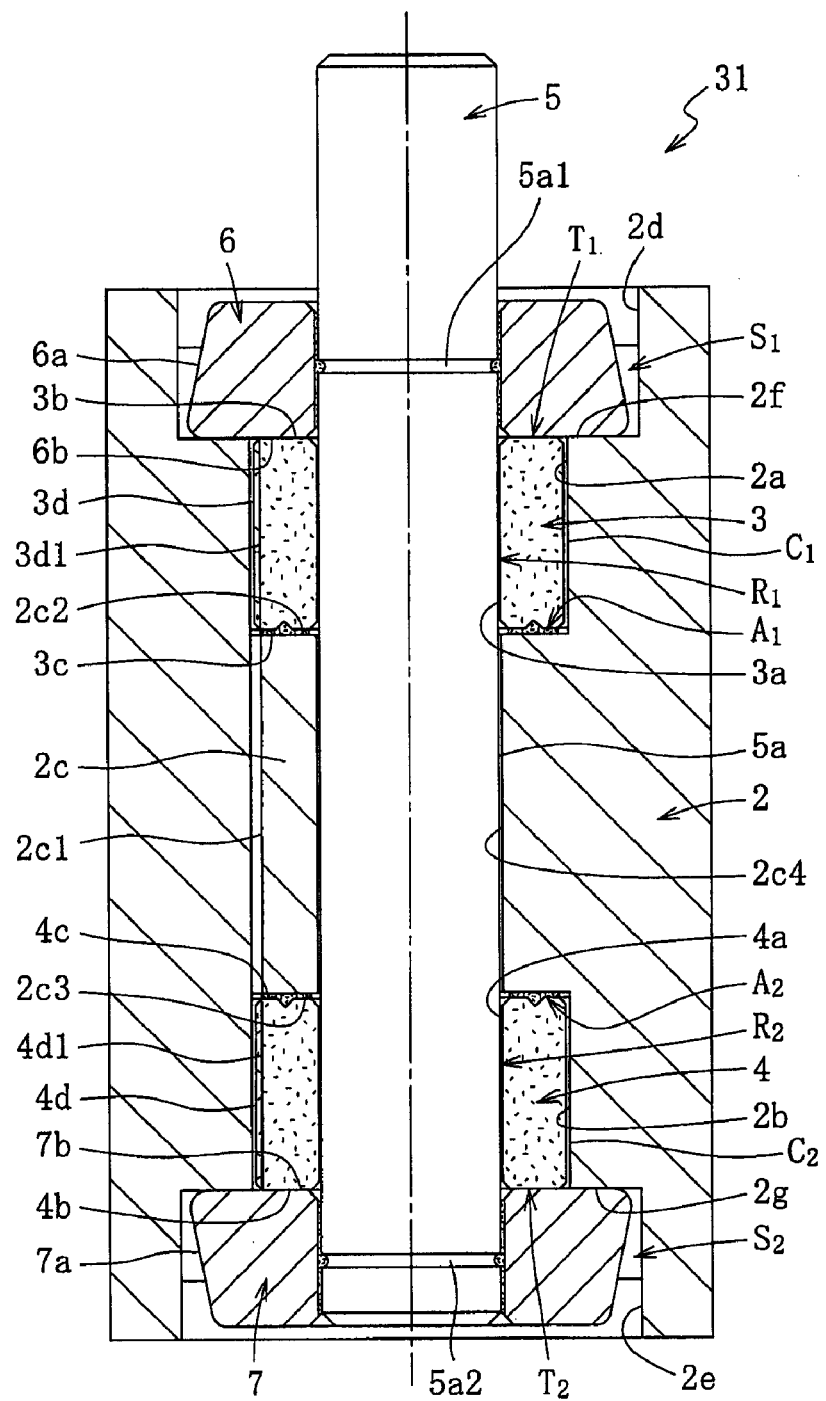
FIG. 7 is a sectional view of a fluid dynamic bearing unit according to a fourth embodiment.
Figure 8:
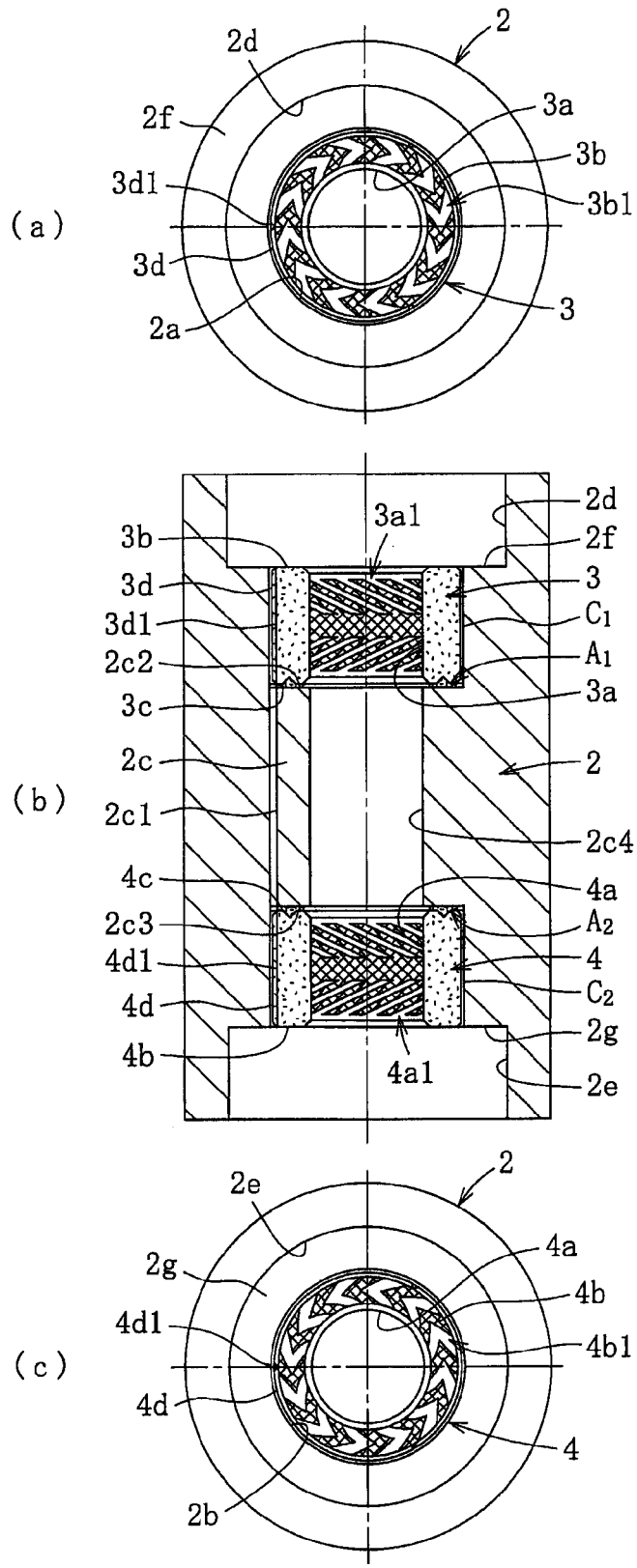
FIGS. 8A, 8B, and 8C are a top view, sectional view, and bottom view, respectively, showing a state where bearing sleeves are fixed to a housing.
Figure 9:
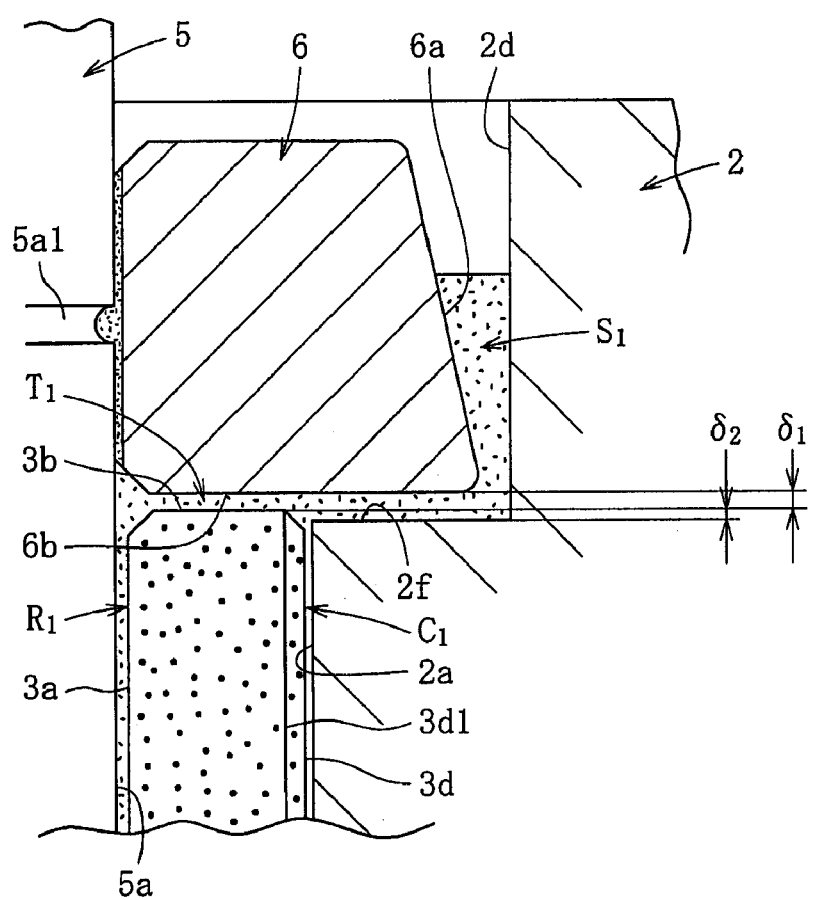
FIG. 9 is an enlarged sectional view showing an upper area of the housing.
Figure 10:
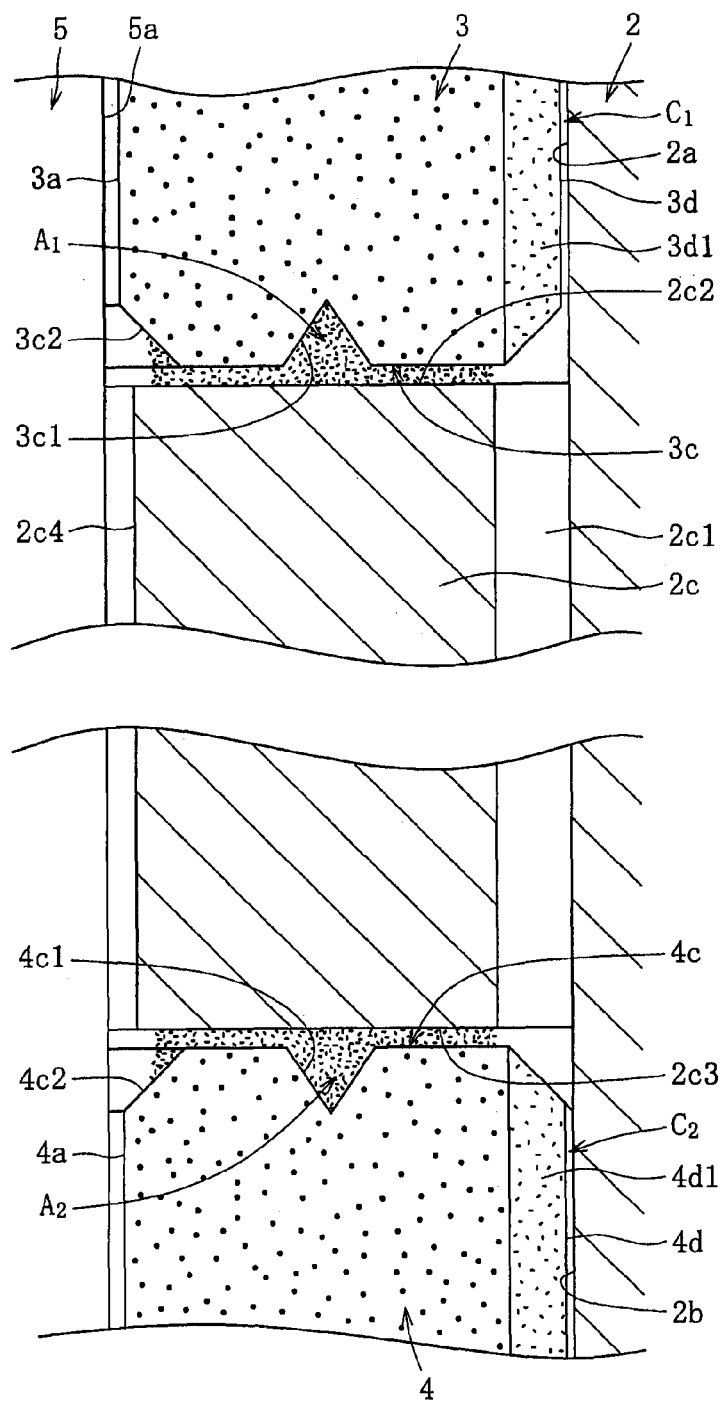
FIG. 10 is an enlarged sectional view showing the vicinities of locations where the bearing sleeves and a spacer part are fixed to each other by adhesion.

FIG. 6 shows a fluid dynamic bearing unit 21 according to a third embodiment. This fluid dynamic bearing unit 21 differs from the fluid dynamic bearing unit 1 according to the foregoing first embodiment in that the inner peripheries 2*a* and 2*b* of the housing 2 extend to the respective ends of the housing 2 with a uniform diameter, and that the seal members 6 and 7 have a relatively small diameter accordingly. This provides the advantage that the housing 2 can be simplified in shape and reduced in diameter as compared to the fluid dynamic bearing unit 1 of the first embodiment. In other respects, the same discussion applies as in the first embodiment. Substantially the same members or parts will thus be designated by like reference numerals, and redundant description will be omitted.

The foregoing first to third embodiments have dealt with the cases where the dynamic pressure generating grooves of herringbone shape are employed as the dynamic pressure generating means of the radial bearing portions $R_1$ and $R_2$ and the thrust bearing portions $T_1$ and $T_2$. Dynamic pressure generating grooves of spiral shape or other shapes may also be used. Otherwise, so-called step bearings or multilobe bearings may be employed as the dynamic pressure generating means.

FIGS. 7, 8A to 8C, 9, and 10 show a fluid dynamic bearing unit 31 according to a fourth embodiment, respectively corresponding to FIGS. 1, 2A to 2C, 3, and 4 according to the foregoing first embodiment. This fluid dynamic bearing unit 31 supports rotation of a spindle shaft of a motor which is built in a HDD, for example. The fluid dynamic bearing unit 31 according to this fourth embodiment differs from the fluid dynamic bearing unit 1 according to the foregoing first embodiment in that the bearing sleeves 3 and 4, which are formed in a cylindrical shape of a porous body of sintered metal, for example, or a porous body of sintered metal mainly composed of copper in particular, are inserted into the inner peripheries 2*a* and 2*b* of the housing 2 with small radial gaps $C_1$ and $C_2$, respectively. These radial gaps $C_1$ and $C_2$ have such sizes as can absorb all the difference in thermal contraction between the resin housing 2 and the sintered metal bearing sleeves 3 and 4 ascribable to their different coefficients of linear expansion, for example, within the intended range of temperature variations. Note that the radial gaps $C_1$ and $C_2$ may be set to the same size or different sizes. In other respects, the same discussion applies as in the first embodiment. Substantially the same members or parts will thus be designated by like reference numerals, and redundant description will be omitted.

Figure 11:
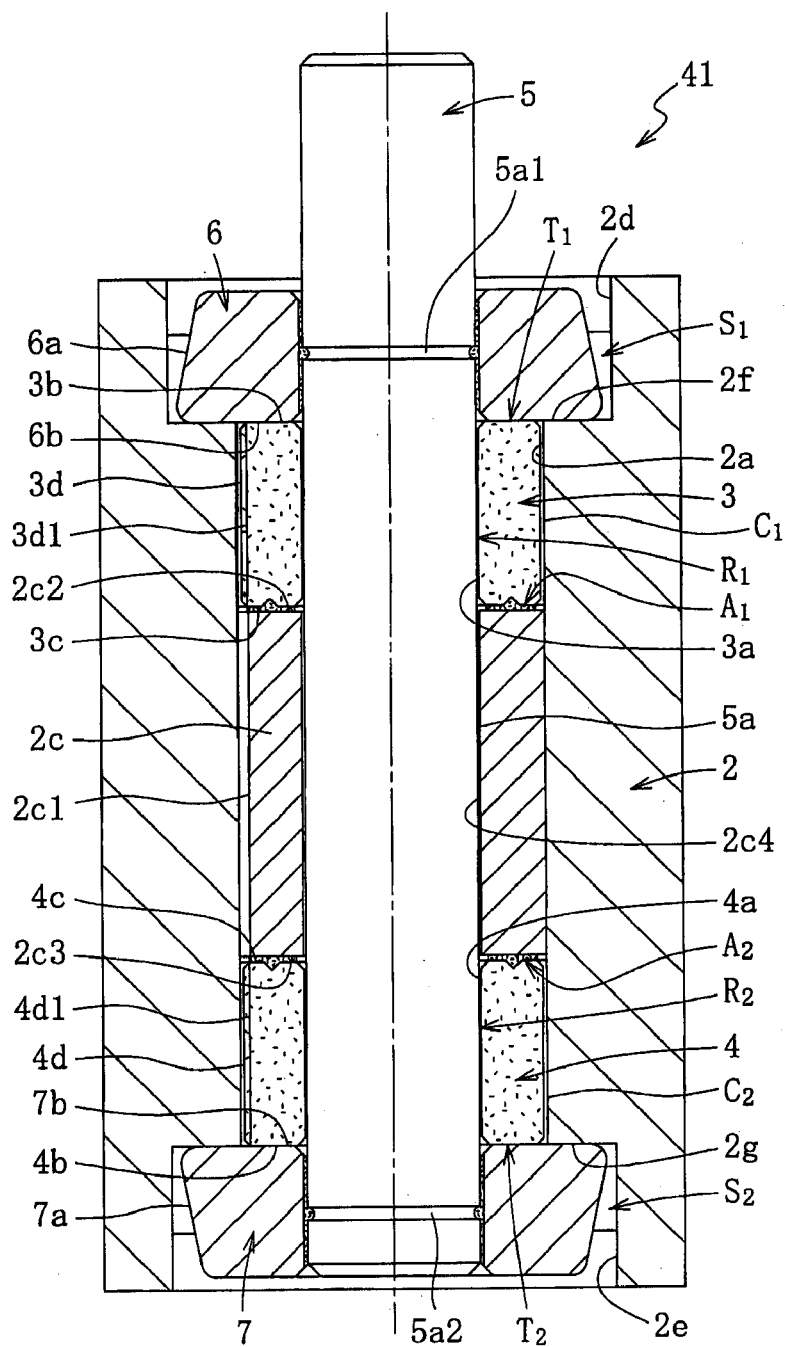
FIG. 11 is a sectional view of a fluid dynamic bearing unit according to a fifth embodiment.

FIG. 11 shows a fluid dynamic bearing unit 41 according to a fifth embodiment. This fluid dynamic bearing unit 41 differs from the fluid dynamic bearing unit 31 according to the foregoing fourth embodiment in that the spacer part 2*c* is made of a sleeve-like member separate from the housing 2, and this spacer part 2c is fixed to the inner periphery 2a of the housing 2 by appropriate means such as adhesion, press fit, and press-fit adhesion. The fluid channels 2c1 are formed in the outer periphery of the spacer part 2c in the form of axial grooves. This spacer part 2c may be made of a resin material the same as or different from that of the housing 2, or a metal material. The inner periphery 2a of the housing 2 has an axially straight shape between the locations where the bearing sleeve 3 is mounted on and where the bearing sleeve 4 is mounted on. As compared to the fluid dynamic bearing unit 31 of the fourth embodiment, the housing 2 is simplified in shape. In other respects, the same discussion applies as in the fourth embodiment. Substantially the same members or parts will thus be designated by like reference numerals, and redundant description will be omitted.

Figure 12:
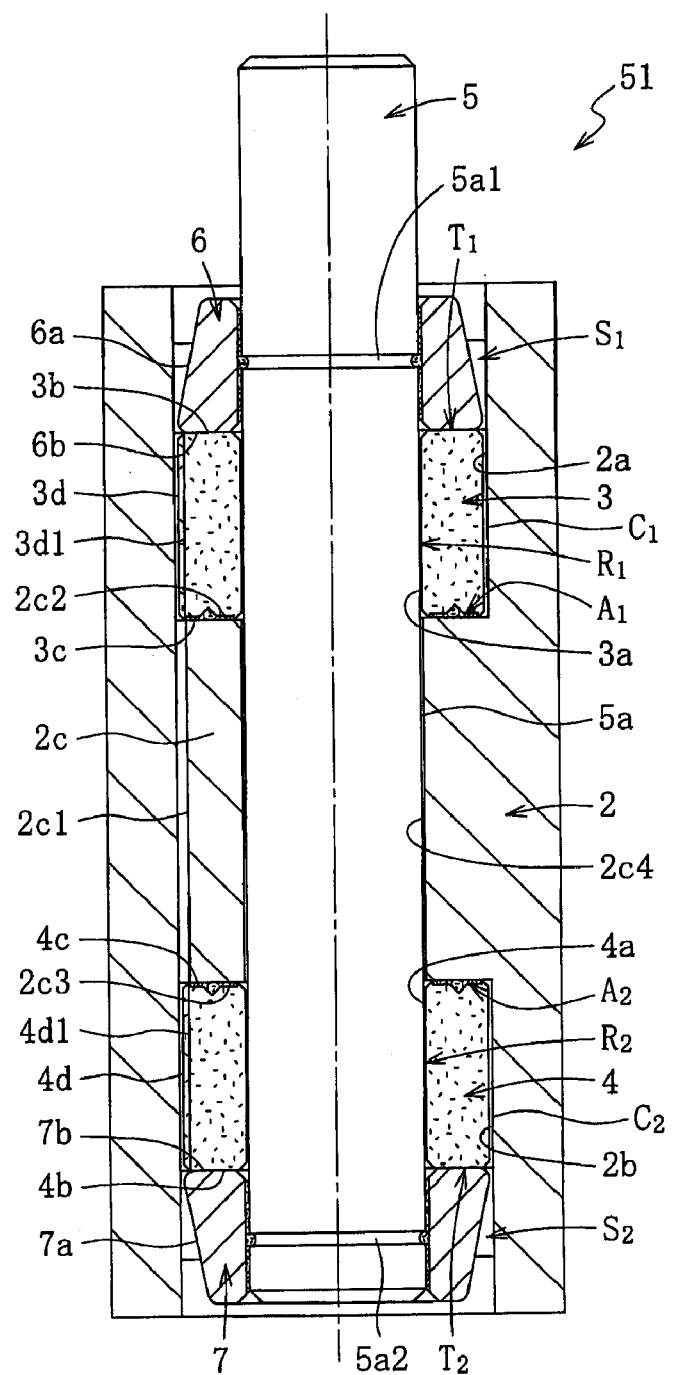
FIG. 12 is a sectional view of a fluid dynamic bearing unit according to a sixth embodiment.

FIG. 12 shows a fluid dynamic bearing unit 51 according to a sixth embodiment. This fluid dynamic bearing unit 51 differs from the fluid dynamic bearing unit 31 according to the foregoing fourth embodiment in that the inner peripheries 2a and 2b of the housing 2 extend to the respective ends of the housing 2 with a uniform diameter, and that the seal members 6 and 7 have a relatively small diameter accordingly. This provides the advantage that the housing 2 can be simplified in shape and reduced in diameter as compared to the fluid dynamic bearing unit 31 of the fourth embodiment. In other respects, the same discussion applies as in the fourth embodiment. Substantially the same members or parts will thus be designated by like reference numerals, and redundant description will be omitted.

The foregoing fourth to sixth embodiments have dealt with the cases where the dynamic pressure generating grooves of herringbone shape are employed as the dynamic pressure generating means of the radial bearing portions $R_1$ and $R_2$ and the thrust bearing portions $T_1$ and $T_2$. Dynamic pressure generating grooves of spiral shape or other shapes may also be used, however. Otherwise, so-called step bearings or multi-lobe bearings may be employed as the dynamic pressure generating means.

What is claimed is:

1. A fluid dynamic bearing unit including:
    a housing;
    a bearing sleeve accommodated in the housing;
    a shaft member inserted into an inner periphery of the bearing sleeve; and
    a radial bearing portion for supporting the shaft member in a radial direction without contact by a dynamic pressure effect of a lubricating fluid occurring in a radial bearing clearance between the inner periphery of the bearing sleeve and an outer periphery of the shaft member, the fluid dynamic bearing unit being characterized in that:
    the bearing sleeve comprises a plurality of bearing sleeves arranged axially separated from each other;
    a spacer part arranged between the axially-separated bearing sleeves;
    the spacer part is stationarily arranged on the housing;
    the plurality of bearing sleeves are fixed to the spacer part by adhesion at their respective ends opposed to ends of the spacer part; and
    an adhesive pocket having a circumferential groove shape along a circumferential direction is formed between the respective ends of said bearing sleeves and the ends of the spacer part.

2. A fluid dynamic bearing device as described in claim 1, wherein the spacer part has a fluid channel opened to both axial sides.

3. A fluid dynamic bearing device as claimed in claim 2, wherein the fluid channel in the spacer part is put into communication with axial fluid channels formed between the inner periphery of the housing and the outer peripheries of the bearing sleeves.

4. A fluid dynamic bearing device as claimed in claim 1, wherein: the shaft member has a protrusion part protruding radially outward; and
    a thrust bearing portion for supporting the shaft member in a thrust direction without contact by a dynamic pressure effect of the lubricating fluid occurring in a thrust bearing clearance is formed between an end of the protrusion part and an end of one of the bearing sleeves.

5. A fluid dynamic bearing device as claimed in claim 4, wherein a seal space is formed radially outside the protrusion part of the shaft member.

6. The fluid dynamic bearing device as described in claim 1, wherein the housing is an article die-molded from a molten material.

7. A fluid dynamic bearing unit including:
    a housing;
    a bearing sleeve accommodated in the housing;
    a shaft member inserted into an inner periphery of the bearing sleeve; and
    a radial bearing portion for supporting a shaft member in a radial direction without contact by a dynamic pressure effect of a lubricating fluid occurring in a radial bearing clearance between the inner periphery of the bearing sleeve and an outer periphery of the shaft member, the fluid dynamic bearing unit being characterized in that:
    the bearing sleeve comprises a plurality of bearing sleeves arranged axially separated from each other;
    a spacer part formed between the axially-separated bearing sleeves;
    the spacer part is stationarily arranged on the housing;
    the plurality of bearing sleeves are inserted into an inner periphery of the housing with a gap, and are fixed to the spacer part by adhesion at the respective ends opposed to ends of the spacer part; and
    an adhesive pocket having a circumferential groove shape along a circumferential direction is formed between the respective ends of said bearing sleeves and the ends of the spacer part.

8. A fluid dynamic bearing device as claimed in claim 7, wherein the spacer part has a fluid channel opened to both axial sides.

9. A fluid dynamic bearing device as claimed in claim 8, wherein the fluid channel in the spacer part is put into communication with axial fluid channels formed between the inner periphery of the housing and the outer peripheries of the bearing sleeves.

10. A fluid dynamic bearing device as claimed in claim 7, wherein: the shaft member has a protrusion part protruding radially outward; and
    a thrust bearing portion for supporting the shaft member in a thrust direction without contact by a dynamic pressure effect of the lubricating fluid occurring in a thrust bearing clearance is formed between an end of the protrusion part and an end of one of the bearing sleeves.

11. A fluid dynamic bearing device as claimed in claim 10, wherein a seal space is formed radially outside the protrusion part of the shaft member.

12. The fluid dynamic bearing device as described in claim 7, wherein the housing is an article die-molded from a molten material.

* * * * *